United States Patent [19]

Gaskins

[11] 4,452,131
[45] Jun. 5, 1984

[54] UNIVERSAL CLIP AND GRILL ASSEMBLY

[76] Inventor: Thomas Gaskins, Cypress Knee Museum, Palmdale, Fla. 33944

[21] Appl. No.: 296,513

[22] Filed: Aug. 26, 1981

[51] Int. Cl.³ ............................................. A47J 37/00
[52] U.S. Cl. ........................................ 99/402; 24/556; 403/408; 16/114 R
[58] Field of Search ................. 99/349, 351, 402, 426; 24/261 R, 139, 255 R, DIG. 10; D7/99, 409, 328, 387, 390

[56] References Cited

U.S. PATENT DOCUMENTS

| | | | |
|---|---|---|---|
| 393,703 | 11/1888 | Harris | 24/255 R |
| 752,497 | 2/1904 | Wilson | 99/402 |
| 1,942,893 | 1/1934 | Harris | 24/261 R |
| 3,056,344 | 10/1962 | Miller | 99/402 X |
| 3,152,536 | 10/1964 | Lucas | 99/402 X |
| 3,495,524 | 2/1970 | Miles | 99/402 X |
| 3,704,141 | 11/1972 | Grossman | 99/402 |

Primary Examiner—Billy J. Wilhite
Attorney, Agent, or Firm—Mason, Fenwick & Lawrence

[57] ABSTRACT

A food support device has first and second planar grill members between which food items are positioned with clamping members being positioned along opposite side edges of the grill members for urging said grill members toward each other for clamping food items; each clamping member has first and second side hooks each facing in one direction and fitted over one edge of one grill member with a center hook positioned equidistantly between the first and second side hooks and facing in an opposite direction being fitted over an edge of the other of said grill member; spring means connecting the side hooks and the center hook for urging the hooks in their facing directions so that the grill members are urged toward each other.

7 Claims, 9 Drawing Figures

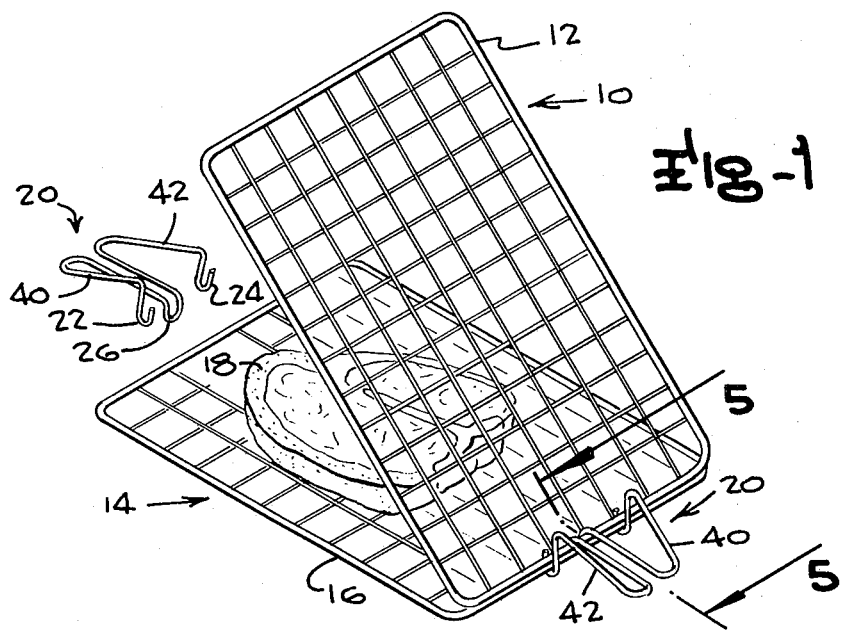
Fig-1
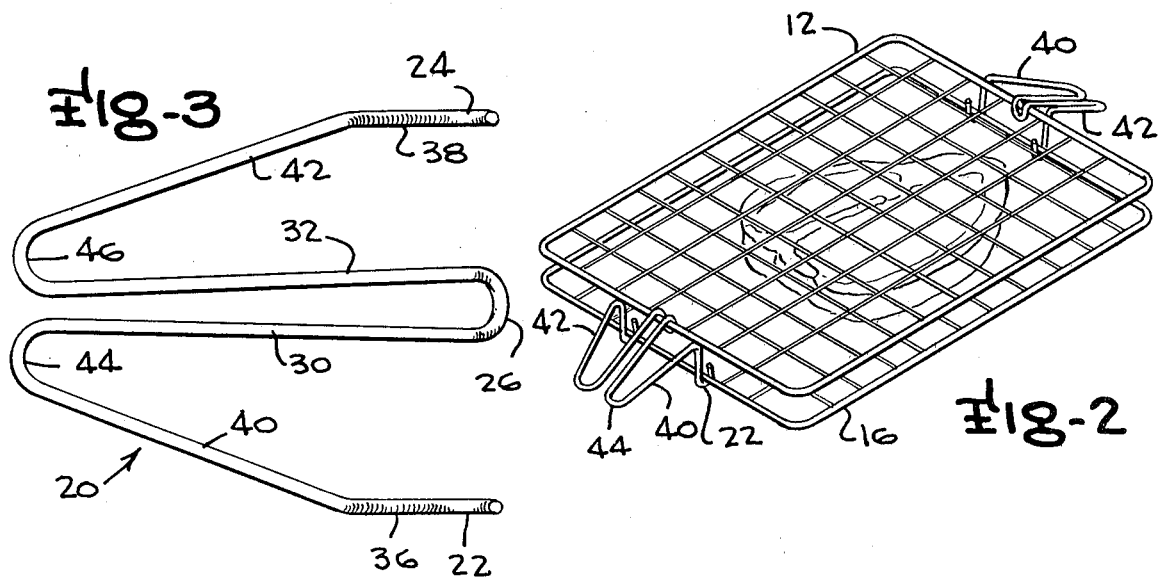
Fig-3
Fig-2
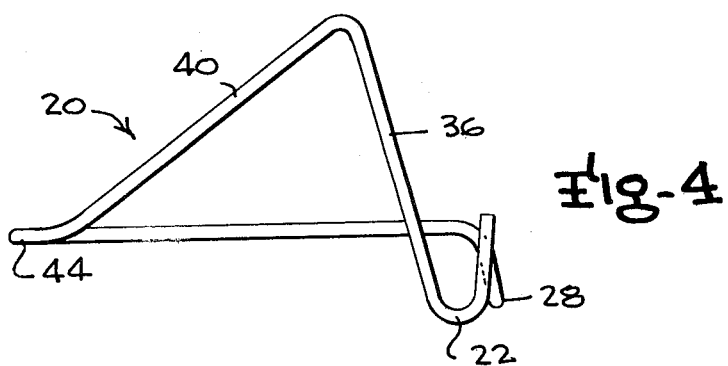
Fig-4

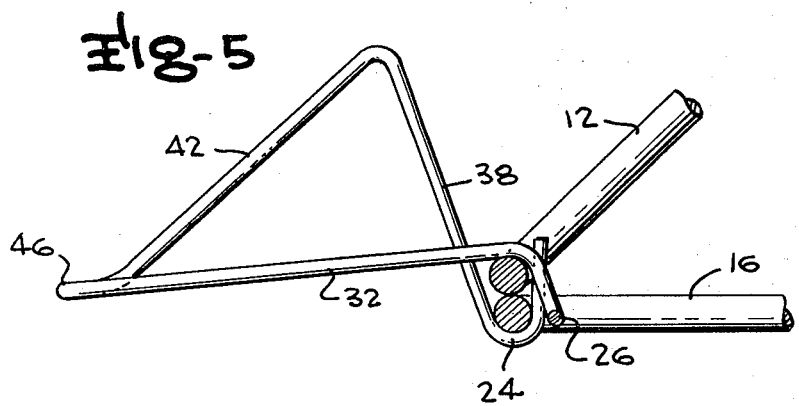
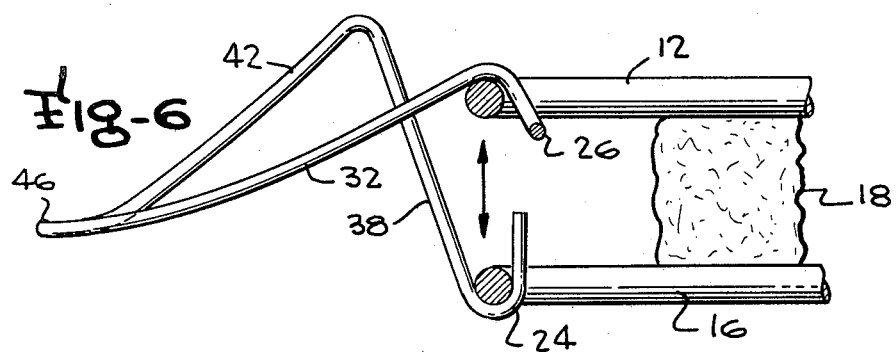
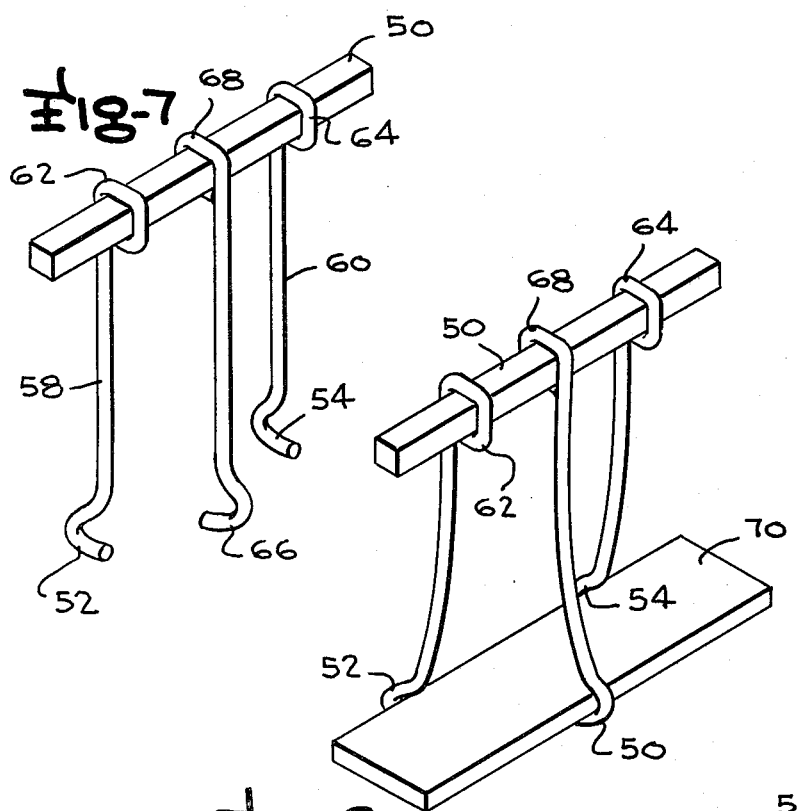
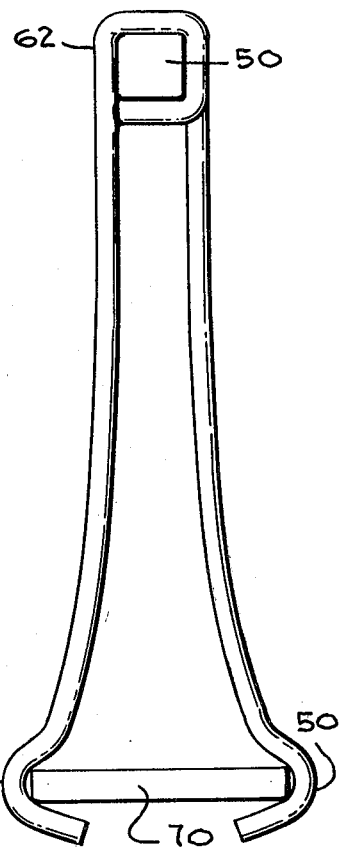

UNIVERSAL CLIP AND GRILL ASSEMBLY

BACKGROUND OF THE INVENTION

The present invention, in its preferred embodiment, is directed to the food cooking field but has wide applications elsewhere in the field of article holding and clamping devices. More specifically, the present invention is directed to a unique grill clamping and holding combination for holding meat or other food items between oppositely spaced grill members which clamp the food items therebetween for cooking adjacent a bed of coals or other radiant heat source.

A variety of food cooking or grilling devices have evolved in recent years employing the concept of a pair of vertically extending grill members between which the food items are positioned and held for cooking. A variety of devices have evolved along these lines as exemplified by U.S. Pat. Nos. 1,701,033; 2,335,217; 2,441,190; 2,456,397; 2,690,171; 2,821,187; 2,891,465; 2,923,229; 3,091,170; 3,140,651; 3,237,621; 3,276,351; 3,302,555; 3,611,912; 3,742,838 and 4,120,237.

Additionally, there has always been a continuing need for clamping devices for engaging and holding all types of items in clamped position. An ideal clamping device should have the ability to positively and forcefully engage the items being clamped but should also have the capability of ease of operation and have a long and trouble-free life. These desirable objects have not been possessed by the prior-known devices which have suffered from a number of defects.

Therefore, it is a primary object of this invention to provide a new and improved food support device for supporting food to be grilled and to also provide a new and improved clamping means of general versatility.

SUMMARY OF THE INVENTION

The preferred embodiment of the subject invention comprises a pair of parallel metal food grills between which food items such as steak or the like are positioned and clamped by operation of inventive clamping members engageable with opposite edges of the grill members. More specifically, the clamping members each comprise first and second side hooks each facing in one direction and fitted over one edge of one of the grill members with a center hook being positioned equidistantly between the first and second side hooks but facing in an opposite direction. The center hook is engaged with the other of the grill members and spring means between the center hook and the side hooks cause the hooks to be urged toward each other so as to urge the grill members toward each other to hold any food item therebetween in position. In the preferred embodiment the center hooks and the side hooks are unitarily formed with a spring portion all formed of a single piece of spring steel with the center hook comprising a U-shaped center portion of the spring steel and having an outer downwardly turned end lip defining the hook portion per se for engagement with one of the grill members. The side hooks are all formed at the end of single linear side rods extending generally upwardly and which are connected at their upper ends to the upper ends of canted connector rods each having a lower end connected by a horizontal arcurate connector portion to a respective one of horizontal center leg members forming a portion of the center hook member. The arrangement is such that the assembly is easily actuated but provides a forceful clamping of the grill members tending to move them toward each other. Additionally, it should be understood that the clamping member per se can be used for clamping other items.

A second embodiment of the invention employs an individual center hook formed of a singular linear piece of spring steel and side hooks which face in an opposite direction from the center hook which are also formed of a singular linear piece of spring steel. The base ends of the linear single pieces of spring steel are wrapped and welded to a square carrier bar for retaining same fixedly so as to provide a heavy duty support for the hook assembly. The device works in essentially the same manner as the first embodiment.

A better understanding of the disclosed embodiments of the invention will be achieved when the following detailed description is considered in conjunction with the appended drawings in which like reference numerals are used for the same parts as illustrated in the different drawing figures.

BRIEF DESCRIPTION OF THE DRAWING

FIG. 1 is a perspective view of the preferred embodiment consisting of a food clamping and holding assembly for grilling or barbecuing a food item with the parts illustrated in their open condition;

FIG. 2 is a perspective view similar to FIG. 1 but illustrating the parts in a closed position;

FIG. 3 is a top plan view of the clamping member employed in the preferred embodiment;

FIG. 4 is a front elevation view of the clamping member of FIG. 3;

FIG. 5 is a sectional view taken along lines 5—5 of FIG. 4 illustrating the edges of the grill members associated and held in pivotal relationship with respect to each other by the preferred clamping member;

FIG. 6 is a sectional view taken along a line similar to FIG. 5 but illustrating the parts in the position assumed during the clamping of both edges of the grill members about the food item to be cooked;

FIG. 7 is a perspective view of a second clamping member embodiment;

FIG. 8 is a perspective view of the embodiment of FIG. 7 illustrating same in conjunction with a clamped panel plate or the like; and FIG. 9 is an end elevation view of the clamping member and associated item of FIG. 8.

DESCRIPTION OF THE PREFERRED EMBODIMENTS

FIG. 1 illustrates the preferred embodiment comprising an upper metal grill member 10 having a border frame 12 and a lower metal grill member 14 having a border frame 16 with the grill members being of conventional construction. In normal use, a food item such as a steak 18 is positioned between the upper metal grill member 10 and the lower metal grill member 14 and is held in position by first and second clamping member 20 engageable with the border frames 12 and 16 of the grill members 10 and 14 for urging the grill members toward each other. The food item 18 is positioned between the grill members so that it will be retained between the grill members even though the grill members might be positioned in a vertical orientation such as shown in my earlier co-pending patent application Ser. No. 165,947 now U.S. Pat. No. 4,338,912. Moreover, the grill members are moved toward each other even with shrinkage of the food item so that the food item is continuously clamped between the grill members.

FIGS. 3 and 4 illustrate the construction of the individual clamping members 20. The following description of the individual clamping members refers to the relative positioning and orientation of the parts as shown in FIGS. 3 and 4 with "horizontal", "vertical", "right", "left", "up", and "down" being the direction and relative orientation of the parts as shown in these figures. These directions and orientations are also used in the following claims, and it should be understood that they are relative in that the clamp members themselves can obviously be oriented in any desired manner without the relative positioning and direction of the parts being changed. Keeping the foregoing in mind, it should be observed that the clamp members 20 are formed of a single piece of spring steel and include first and second upwardly facing side hooks 22 and 24 between which a center hook 26 is positioned. It should be observed that the side hooks 22 and 24 face upwardly whereas the center hook 26 faces downwardly. When the clamp member is in its static at rest state the parts are as shown in FIG. 4. The center hook 26 comprises a U-shaped outer end lip 28 which extends downwardly and first and second substantially horizontal straight center legs 30 and 32 which extend horizontally to the left. The side hooks 22 face upwardly and extend from the lower ends of single linear upwardly and leftwardly canted side rods 36 and 38 which are connected at their upper ends to the upper ends of canted connector rods 40 and 42 respectively. The lower or left ends of the canted connector rods 40 and 42 are connected to horizontal arcurate connector portions 44 and 46 which are connected at their inner ends respectively to the horizontal straight center legs 30 and 32 as best shown in FIG. 3.

In use as shown in FIGS. 1 and 2, the clip members are positioned so that the lower side hooks 22 and 24 engage the border frame 16 of the lower grill member 14 while the center hook 26 engages the upper border frame 12. The upper grill 10 and lower grill 14 are consequently biased toward each other by the operation of the two clamp members 20. Food 18 held between the grill members is consequently maintained in position by the clamping force of the clamp members 20 acting on the grill members as shown in FIG. 6.

A significant aspect of the operation of the clamp members is the fact that upon release of one of the clamp members the other clamp member moves the edges of the two border frame members 12 and 16 together as shown in FIG. 5 so that the upper grill and its associated border frame 16 can pivot upwardly as shown in FIG. 1 to permit the insertion or removal of the food from between the grill elements. However, upon closure of the grill members to their horizontal parallel position, the border frame edges separate as shown in FIG. 6 and are separted by a space equal to the thickness of the food element 18.

FIGS. 7, 8, and 9 illustrate an alternative embodiment of the clamping member in which the hook members are individually formed on individual discreet pieces of spring steel mounted on a square carrier rod 50. More specifically, side hooks 52 and 54 are respectively formed of individual spring steel rods 58 and 60 having their ends 62 and 64 opposite the hook portions wrapped around and welded to the square carrier rod 50. Similarly, a center hook 66 is formed in an individual piece of spring steel having an end 68 wrapped around and welded to the square carrier rod 50. FIG. 8 illustrates the manner in which the second embodiment is connectable to a planar panel or slat-type element 70 by engaging the center hook 50 with one edge of the element 70 while engaging the opposite edges with the side hooks 52 and 54.

It should be understood that the clamping members of both embodiments are capable of being used in literally thousands of ways for clamping a like number of different items for a like number of purposes. Thus, it should be understood that the spirit and scope of the invention is not to be limited by the disclosed embodiments but is to be limited solely by the appended claims.

I claim:

1. A food support device comprising first and second planar grill members between which food items to be cooked are positioned and clamping members removably positioned along opposite side edges of said planar grill members for urging said grill members toward each other for clamping food items therebetween, said clamping members each comprising first and second side hooks each facing in one direction and fitted over one edge of one grill member, a center hook positioned equidistantly between said first and second side hooks but facing in an opposite direction from the facing direction of said side hooks and fitted over an edge of the other of said grill members and spring means connecting said hooks and said center hook for urging said hooks in their facing directions so that said first and second planar grill members are urged toward each other.

2. The invention of claim 1 wherein said side hooks, said center hook and said spring means are unitarily formed of a single piece of spring steel.

3. The invention of claim 2 wherein said center hook faces downwardly and comprises a U-shaped outer end lip and first and second substantially horizontal straight center legs, said side hooks face upwardly and extend from the lower ends of single linear side rods extending generally upwardly and which are connected at their upper ends to the upper ends of canted connector rods each having a lower end connected by a horizontal arcurate connector portion to a respective one of said substantially horizontal center legs.

4. The invention of claim 1 wherein said clamping members each include a square carrier rod and said side hooks and said center hook are respectively formed of individual pieces of spring steel rod material having one end wrapped around and fixedly connected to the square carrier rod and having an opposite end comprising a hook-shaped curved portion.

5. The invention of claim 1 wherein said side hooks, said center hook and said spring means are formed of spring steel.

6. The invention of claim 5 wherein said center hook faces downwardly and comprises a U-shaped outer end lip and first and second substantially horizontal straight center legs, said side hooks face upwardly and extend from the lower ends of single linear side rods extending generally upwardly and which are connected at their upper ends to the upper ends of canted connector rods each having a lower end connected by a horizontal arcurate connector portion to a respective one of said substantially horizontal center legs.

7. The invention of claim 1 wherein said center hook faces downwardly and comprises a U-shaped outer end lip and first and second substantially horizontal straight center legs, said side hooks face upwardly and extend from the lower ends of single linear side rods extending generally upwardly and which are connected at their upper ends to the upper ends of canted connector rods each having a lower end connected by a horizontal arcurate connector portion to a respective one of said substantially horizontal center legs.

* * * * *